United States Patent [19]
Sato

[11] Patent Number: 5,365,377
[45] Date of Patent: Nov. 15, 1994

[54] LENS SYSTEM
[75] Inventor: Kenichi Sato, Tokyo, Japan
[73] Assignee: Fuji Photo Optical Co., Ltd., Omiya, Japan
[21] Appl. No.: 77,995
[22] Filed: Jun. 18, 1993
[30] Foreign Application Priority Data
  Jun. 19, 1992 [JP] Japan .................................. 4-186341
  Jun. 19, 1992 [JP] Japan .................................. 4-186342
[51] Int. Cl.$^5$ ............................................. G02B 13/18
[52] U.S. Cl. ..................................... 359/718; 359/739
[58] Field of Search ........................ 359/718, 719, 739
[56] References Cited
  FOREIGN PATENT DOCUMENTS
  63-199313 8/1988 Japan .
  2-106710 4/1990 Japan .
  0560162 3/1944 United Kingdom ................. 359/718

Primary Examiner—Loha Ben
Assistant Examiner—Evelyn A. Lester
Attorney, Agent, or Firm—Keck, Mahin & Cate

[57] ABSTRACT

A taking lens system for a camera includes a positive meniscus type of single component bi-aspherical lens and an aperture stop disposed facing a convex aspherical surface of the single component bi-aspherical meniscus lens. The single component bi-aspherical lens is designed and adapted such that a ratio of a radius of curvature of a reference concave spherical surface of the concave aspherical surface to a radius of curvature of a reference convex spherical surface of the convex aspherical surface is between 1.0 and 2.5.

7 Claims, 6 Drawing Sheets

SPHERICAL ABERRATION

CURVATURE OF FIELD

DISTORTION

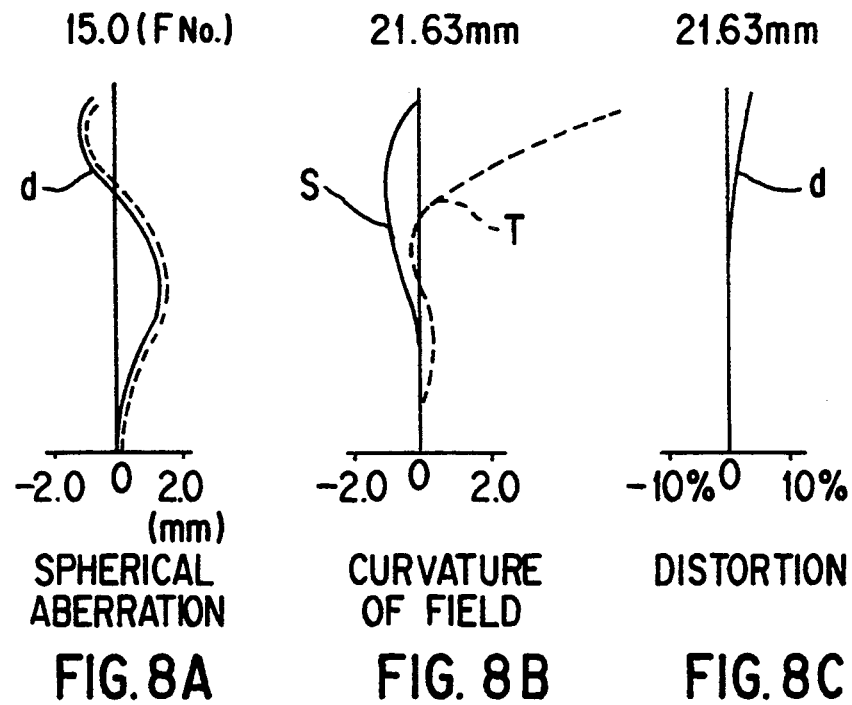
FIG. 8A SPHERICAL ABERRATION
FIG. 8B CURVATURE OF FIELD
FIG. 8C DISTORTION
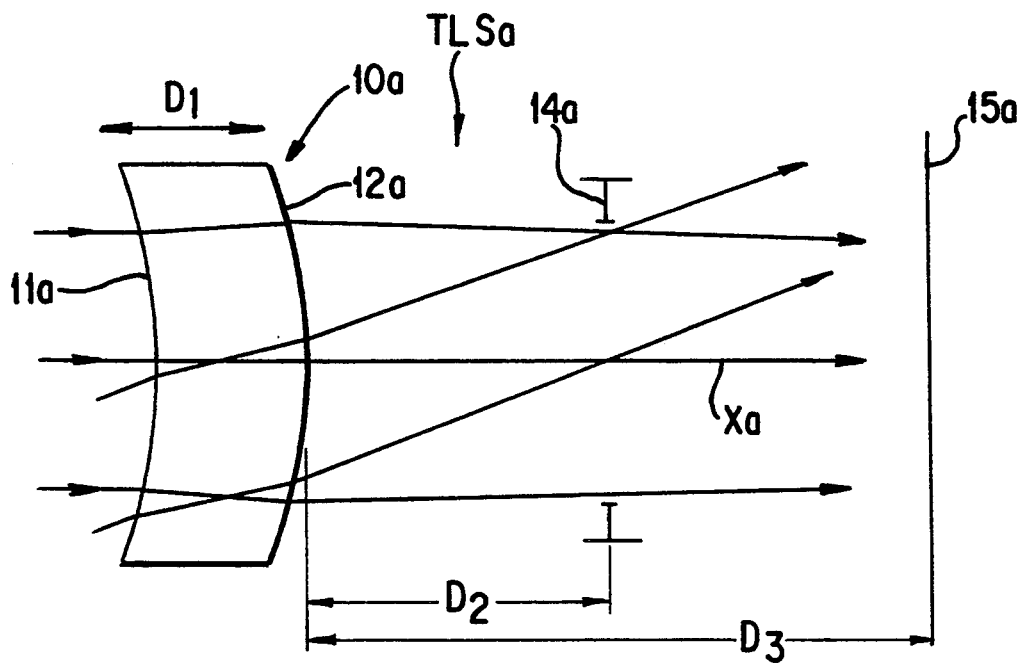
FIG. 9

SPHERICAL ABERRATION

CURVATURE OF FIELD

DISTORTION

SPHERICAL ABERRATION

CURVATURE OF FIELD

DISTORTION

LENS SYSTEM

BACKGROUND OF THE INVENTION

1. Field of the Invention

This invention relates to a lens system comprised of a single component aspherical lens and an aperture stop, and, more particularly, to a taking lens system comprised of an aspherical lens and an aperture stop suitable for easy-to-use photographic cameras and closed circuit TV cameras.

2. Description of Related Art

Typically, easy-to-use or disposable cameras, such as what is called a "lens equipped film package," have single component taking lenses with diaphragms or aperture stops. Although such a single component taking lens system is usually inferior in optical performance to multiple component taking lens systems, nevertheless it is still sufficiently practical for easy-to-use cameras and really simplifies the structure of a camera.

Single component lenses for use with single component taking lenses are mostly of the type having one surface convex to the subject end as known from, for instance, Japanese Unexamined Patent publications No. 63-199,313 and No. 63-106,710. However, because such a single component lens is insufficient in correction of aberrations, in particular chromatic aberrations or chromatic aberrations of magnification, it must be improved in order to provide desirable resolution.

A reference is made to FIGS. 1 through 3 for the purpose of providing a brief introduction of a conventional single component taking lens systems that will enhance an understanding of the optical structure of the single component taking lens system of the present invention.

As shown in FIG. 1, a taking lens system is comprised of a single component lens 1 and a fixed aperture stop 2. The single component lens 1 is a meniscus lens provided so that it has a convex surface facing to the subject end. It is featured in the prior art taking lens system that the fixed aperture stop 2 is attached to the single component lens 1 on the image end. For this taking lens system, the correction of achromatic aberrations is insufficient.

Further, when applying single component taking lens systems to what are called "Z-type easy-to-use cameras," in which an optical path is folded in a "Z" form, complications arise because of a relatively short back focal distance. For instance, referring to FIG. 2, which schematically shows an optical arrangement of a Z-type easy-to-use camera, a single component taking lens 1a, comprised of a biconvex single component lens, has a convex surface facing to the subject end. Behind the single taking lens 1a, or on the image end of the taking lens 1a, there are provided a stationary aperture stop 2a, a shutter 3a and reflection mirrors 4 and 5 arranged in an optical axis Xa in order from the object end toward the image end. The reflection mirrors 4 and 5 are placed in parallel with each other so as to form a parallel folded optical axis Xa between the single component taking lens 1a and an image plane 15a in which a film is placed.

In such a Z-type easy-to-use camera with a single component taking lens 1a whose convex surface is directed to the object end, since a back focus distance, namely a back focal distance, of the single component taking lens 1a is unavoidably relatively short, the camera components, i.e. the stationary aperture stop 2a, shutter 3a and reflection mirrors 4 and 5, have to be disposed and laid out in a short axial distance between the single component taking lens 1a and the image plane 15a. Such a tight disposition of the camera components renders the camera components permissive to interfere with the optical path.

In an attempt to avoid the issue of mechanical lay out, it is acceptable to employ a single component taking lens with its surface concave to the object end. This is because such a single component lens 1b, with its concave surface directed toward the object end, is provided with an aperture stop 2b placed on the object end or an opposite side to an image plane 15b as shown in FIG. 3. Such is described in, for instance, Japanese Unexamined Patent Publication No.64-49014. However, the single component lens, such as a meniscus lens, renders camera components still permissive to interfere with the optical path.

SUMMARY OF THE INVENTION

It is therefore an object of the present invention to provide a single component taking lens system of which a single component lens is consisted of aspherical surfaces on both sides so as to eliminate various aberrations including the achromatic aberration of magnification.

It is another object of the present invention to provide a single component taking lens system of which a single component lens is consisted of aspherical lens surfaces on both sides so as to provide a high resolution.

It is still another object of the present invention to provide a single component taking lens system which has a long back focal distance.

The foregoing objects of the present invention are achieved by providing a taking lens system for a camera having a positive meniscus type of single component bi-aspherical lens and an aperture stop disposed facing a convex aspherical surface of the single component bi-aspherical lens. The single component bi-aspherical lens has a concave aspherical surface, which has a surface sag, from its reference concave spherical surface, increasing with a semi-aperture distance from the optical axis of the single component bi-aspherical lens so as to cause a gradual increase in negative power, and a convex aspherical surface, which has a surface sag, from its reference convex spherical surface, increasing with a semi-aperture distance from the optical axis so as to cause a gradual increase in positive power. The ratio of a radius of curvature of the reference concave spherical surface to a radius of curvature of the reference convex spherical surface is established to be between 1.0 and 2.5. Further, the single component bi-aspherical lens may be placed with the convex aspherical surface directed toward any one of the object end and the image end.

When directing the convex aspherical surface toward the object end, i.e. placing the aperture stop on the object side relative to the single component bi-aspherical lens, principal rays of marginal rays which are incident pass a portion of the convex aspherical surface with a higher positive power first and then a portion of the concave aspherical surface with a higher negative power. In addition, since the disposition of the aperture stop on the object end causes the principal ray to pass the concave aspherical surface at a semi-aperture distance from the optical axis higher than the convex aspherical surface, the principal ray is strongly affected by the concave aspherical surface more than the convex aspherical surface, which causes a decrease in positive chromatic aberrations of magnification over a wide range of angles of view.

Considering a bundle of rays incident into the single component bi-aspherical lens at a certain angle, upper rays and under rays with respect to the principal ray of the bundle of rays enter the convex aspherical surface and the concave aspherical surface at different semi-aperture distances from the optical axis. Consequently, marginal rays, which are far from the principal ray, are affected differently by the concave aspherical surface and by the convex aspherical surface, so as to correct coma simultaneously for upper and under rays in a wide range of angles of view.

On the other hand, when directing the convex aspherical surface toward the image end, and hence, the concave aspherical surface toward the object end, i.e. placing the aperture stop on the image side relative to the single component bi-aspherical lens, a bundle of incident rays is expanded in diameter by the front, concave aspherical surface, resulting in an increase in the back focal distance of the taking lens system. This provides an increased space between the taking lens system and its image plane in which a film or an imaging device is placed, so as to enable camera components to be disposed where the optical path is interrupted.

BRIEF DESCRIPTION OF THE DRAWINGS

The above and other objects and features of the present invention will be clearly understood from the following detailed description with respect to preferred embodiments thereof when considered in conjunction with the accompanying drawings, in which:

FIG. 8 is a diagram showing various aberrations measured, on a flat image plane, of an another example of the single component taking lens system;

FIG. 9 is a diagrammatic side view of an example of a taking lens system in accordance with another preferred embodiment of the present invention;

DETAILED DESCRIPTION OF THE PREFERRED EMBODIMENTS

In the following description, the term a "reference spherical surface" shall mean and refer to what is coincident with a lens surface at the optical axis.

Figure 1:
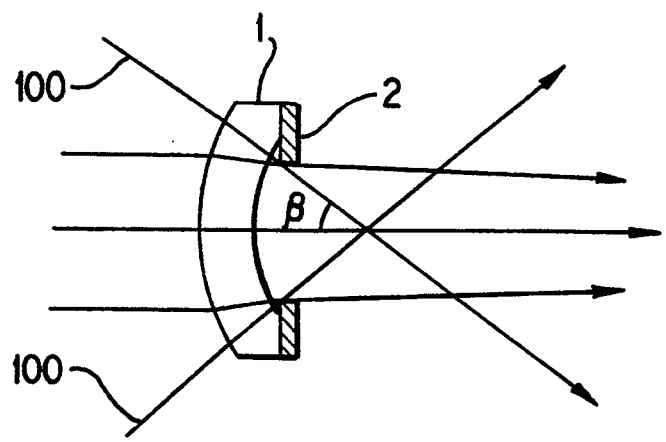
FIG. 1 is a diagrammatic side view of a conventional taking lens system.
Figure 2:
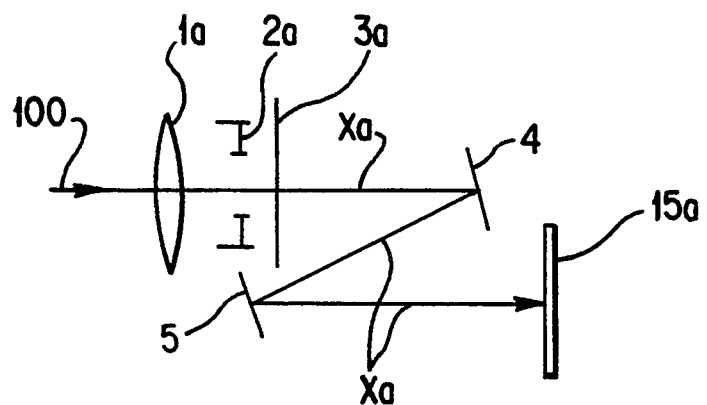
FIG. 2 is a schematic illustration showing an easy-to-use camera with an optical axis folded in "Z-fashion"
Figure 3:
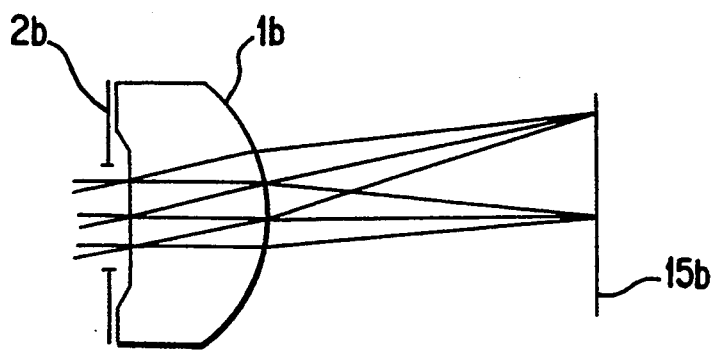
FIG. 3 is a diagrammatic side view of another conventional single component taking lens system.
Figure 4:
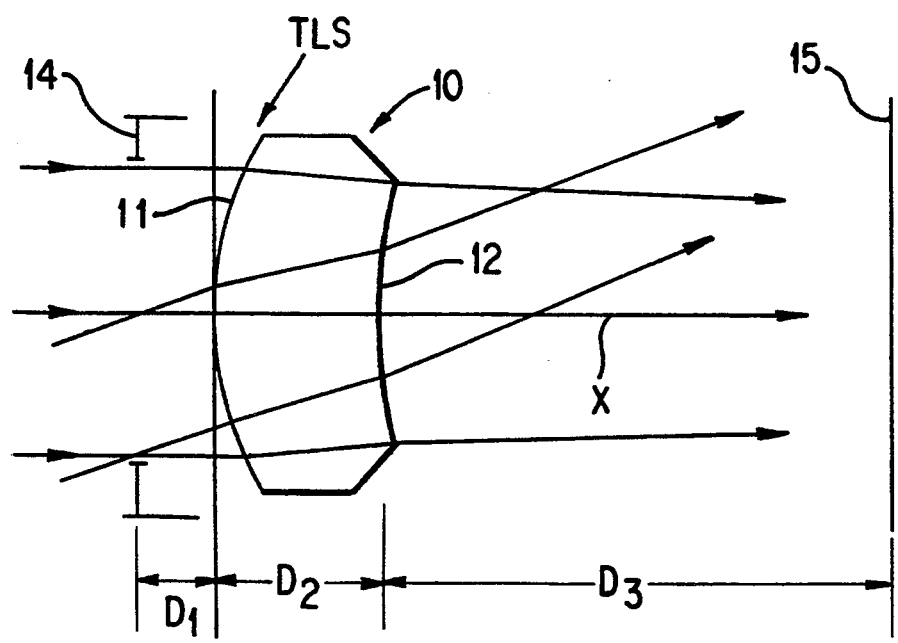
FIG. 4 is a diagrammatic side view of an example of a taking lens system in accordance with a preferred embodiment of the present invention.

Referring to the drawings in detail, and in particular, to FIG. 4, a single component taking lens system (which is hereafter referred to as a taking lens system for simplicity) TLS in accordance with a preferred embodiment of the present invention is shown. The system is comprised of a single component bi-aspherical lens 10 and a fixed aperture stop 14 disposed on the subject end. The single component bi-aspherical lens 10, which is a type of positive meniscus lens and of bi-aspherical lens, consists of a first aspherical surface 11 convex to the subject end and a second aspherical lens surface 12 concave to the image end. The taking lens 10 is positioned at a distance D3 from and fixed relative to an image plane 15 in which a film or imaging devices are placed.

Figure 5:
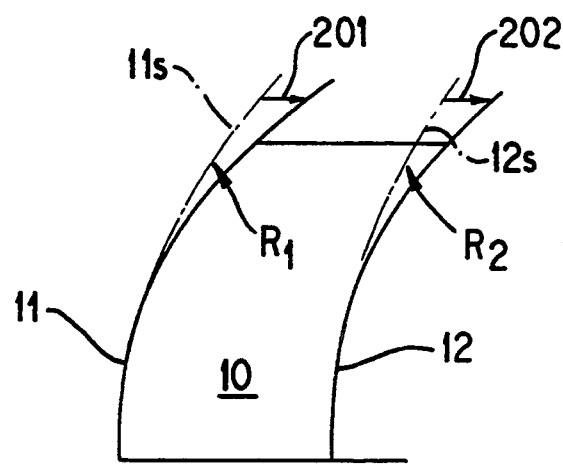
FIG. 5 is an schematic illustration showing aspherical surfaces of a single component bi-aspherical lens of the taking lens system shown in FIG. 4.
Figure 6A:
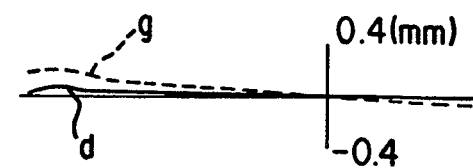
FIG. 6 is a diagram showing lateral chromatic aberrations of the taking lens system shown in FIG. 4.
Figure 6B:
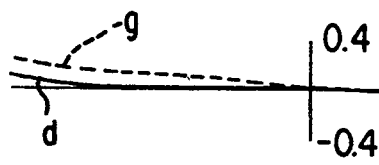
Figure 6C:
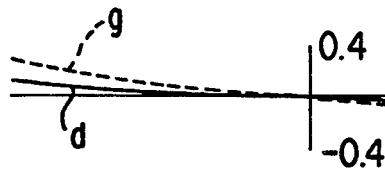
Figure 6D:
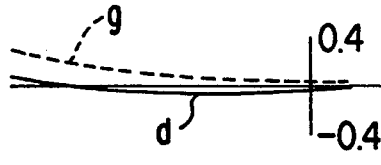

The ratio of a radius of curvature R2 of the second reference spherical surface $12_s$ to a radius of curvature R1 of the first reference spherical surface $11_s$ (which is hereafter referred to as the ratio of radius of reference curvatures for simplicity) is established to be between 1.0 and 2.5. As shown in FIG. 5 the first aspherical surface 11 is apart gradually far from the first reference spherical surface $11_s$ with an increase of lateral distance from the optical axis A as shown by an arrow 201 so as to increase positive power. Similarly, the second aspherical surface 12 is apart gradually far from the second reference spherical surface $12_s$ with an increase of lateral distance from the optical axis A as shown by an arrow 202 so as to decrease negative power.

For applications to simple easy-to-use cameras, the bi-aspherical lens 10 is scaled to have an effective aperture of approximately $4^\phi$ mm and an axial distance or thickness $D_2$ of approximately 1.5 to 3.0 mm. However, the radii of curvature R1 and R2 of the respective first and second reference spherical surfaces $11_s$ and $12_s$ are established depending upon various optical conditions, such as focal distance and the refractive index of lens materials, such as glasses and plastics.

The bi-aspherical lens 10 has its focal plane 15, at a distance D3 on the image end from its rear or second aspherical surface 12, in which a film is placed. The fixed aperture stop 14 is located at a distance D1 on the object end from and fixedly relative to the bi-aspherical lens 10, specifically the first aspherical surface 11. Generally, as well known in the optical field, a single component spherical lens exhibits achromatic aberrations of magnification which result from different refractive indexes for wavelengths. In order to eliminate such achromatic aberration of magnification, it is essential to focus principal rays having various wavelengths on a point in the image plane. A relative position of a point, at which the bi-aspherical lens 10 focuses various wavelengths of principal rays, to the image plane 15 of the bi-aspherical lens 10 is dependable upon an axial distance of the aperture stop 14 from the bi-aspherical lens 10. Accordingly, the distance D1 of the fixed aperture stop 14 from the bi-aspherical lens 10 is established with an intention of focusing various wavelength principal rays passed through the bi-aspherical lens 10 on a point in the image plane 15 so as to eliminate achromatic aberrations of magnification. The bi-aspherical lens 10, however, still remains susceptible to coma.

In order to eliminate coma, the bi-aspherical lens 10 is designed to have the ratio of radius of reference curvatures R2/R1 between 1.0 and is 2.5 and placed with the first convex aspherical surface 11 directed to the object end. Further, the first convex aspherical surface 11 and the second concave aspherical surface 12 have positive and negative powers, respectively, gradually increasing from the center toward the periphery so as to eliminate higher orders of coma. If, on one hand, the ratio of radius of reference curvatures R2/R1 is less than 1.0, each aspherical surface 11 or 12 has to have a larger power and is rendered difficult to be practically formed. On the other hand, if it is higher than 2.5, the bi-aspherical lens 10 exhibits less effect on the elimination or correction of higher order coma. Setting a specific example with reference to FIG. 4, measurements of the bi-aspherical lens 10 are as follows:

| | |
|---|---|
| The diameter of the bi-aspherical lens 10 | 4.2 mm. |
| The radius of curvature R1 of the first reference spherical surface $11_s$ | 6.9039 mm. |
| The radius of curvature R2 of the second reference spherical surface $12_s$ | 7.9290 mm. |
| The ratio of radius of reference curvatures R2/R1 | 1.148 |
| The focal distance of the bi-aspherical lens 10 | 62.67 mm. |
| F-number (F No.) | 15.0 |
| The distance D1 of the aperture stop 14 from the bi-aspherical lens 10 | 1.3 mm. |
| The axial distance D2 between the first and second aspherical surfaces 11 and 12 | 2.3 mm. |
| The distance D3 of the image surface 15 from the bi-aspherical lens 10 | 55.40 mm. |
| The refractive index $n_d$ of the lens glass for d-spectrum (yellow helium: wavelength = 587.56 nm.) | 1.490231 |
| The dispersion $\nu_d$ of the lens glass for d-spectrum (yellow helium: wavelength = 587.56 nm.) | 57.5 |

The aspherical surface may be defined by the following equation:

$$X = \frac{Cy^2}{1 + \sqrt{1 - KC^2y^2}} + \sum_{i=2}^{5} Di \times y^{2i}$$

where
X is the surface sag at a semi-aperture distance y from the optical axis A of the bi-aspherical lens 10,
C is the curvature of the reference spherical surface equal to the reciprocal of the radius of curvature (R1, R2),
K is a conic constant, and
Di is an aspherical coefficient.

The lens of Table I is useful primarily for easy-to-use photographic cameras, industrial TV cameras and closed circuit TV cameras.

TABLE I

| | Surface 11 | Surface 12 |
|---|---|---|
| C | 0.14485 | 0.12612 |
| K | −1.0574141 | 6.8722149 |
| D2 | $9.870394 \times 10^{-4}$ | $-7.5554230 \times 10^{-4}$ |
| D3 | $2.1136114 \times 10^{-5}$ | $-1.2685853 \times 10^{-4}$ |
| D4 | $-3.9899681 \times 10^{-7}$ | $1.3506674 \times 10^{-7}$ |
| D5 | $-3.2388885 \times 10^{-10}$ | $9.0864517 \times 10^{-11}$ |

Referring to FIG. 6, which show graphs illustrating lateral chromatic aberration curves of the specific example of the lens 10. Measurements were made on the image plane 15 at the center of an image area and on coaxial circles of radii of 50%, 70% and 100% of the radius of the image area, respectively, with d-spectrum (wavelength: 587.56 nm) and g-spectrum (wavelength: 435.84 nm) of tangential rays. From reviewing the graphs, it is clearly understood that chromatic aberrations are indistinguishable between d-spectrum and g-spectrum and are reduced effectively.

Figure 7A:
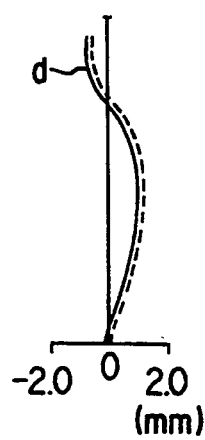
FIG. 7 is a diagram showing various aberrations, other than lateral chromatic aberrations, measured on a curved image plane, of the taking lens system shown in FIG. 4.
Figure 7B:
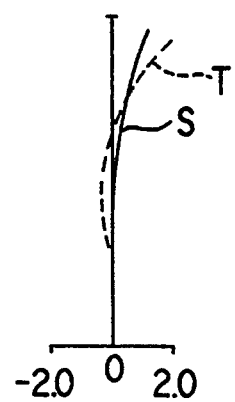
Figure 7C:
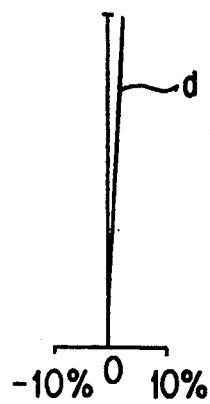

FIGS. 7 and 8 show graphs illustrating curves of other aberrations, such as spherical aberration, curvature of field and distortion, of the specific example of the lens 10. Measurements were conducted for optical evaluation of the lens 10.

Referring to FIG. 7, aberrations of the taking lens system TLS, having a focal distance of 62.67 mm and an F-number of 15.0, were measured on a curved image plane 15 with the radius of curvature of 125 mm with white light. Specifically, spherical aberration was measured for d-spectrum, curvature of field was measured at an image height of 21.63 mm from the optical axis A for a sagittal ray (S) and a tangential ray (T), and distortion was measured at an image height of 21.63 mm from the optical axis A for d-spectrum. From the review of FIG. 7, it is clearly understood that the spherical aberration for d-spectrum is indistinguishable from or complies with the sine condition depicted by a chained line; that the curvature of field for sagittal (S) and tangential (T) rays becomes slightly larger in a close proximity to the periphery and, however, is within permissible limits but astigmatism is small. The distortion is also noticeably small.

Referring to FIG. 8, aberrations of another example of the taking lens system TLS, which is identical in mechanical and optical dimensions with the taking lens system TLS with an exception of a focal distance of 62.67 mm, were measured on a flat image plane 15 with the radius of curvature of 125 mm with white light. Measurements were conducted in the same conditions as the above example. From the review of FIG. 8, it is also understood that the lens 10 exhibits the spherical aberration for d-spectrum which is indistinguishable from or complies with the sine condition depicted by a chained line, the curvature of field for sagittal (S) and tangential (T) rays which are slightly larger in a close proximity to the periphery but within permissible limits and produce only small astigmatism, and noticeably small distortion.

Referring to FIG. 9, a taking lens system TLSa in accordance with another preferred embodiment of the present invention is shown, which is comprised of a single component bi-aspherical lens 10a and a fixed aperture stop 14a disposed between the single component bi-aspherical lens 10a and its image plane 15a on the image end. The bi-aspherical lens 10a, which is a type of positive meniscus, consists of a front or first aspherical surface 11a concave to the subject end and a rear or second aspherical lens surface 12a convex to the image end. Positional dimensions of the taking lens system TLSa are such that the aperture stop 14a and the image plane 15a are located at axial distances D1 and D3, respectively, from the single component bi-aspherical lens 10, specifically the second aspherical lens surface 12a. The ratio of radii of reference curvatures R1/R2 is between 1.0 and 2.5.

Figure 10:
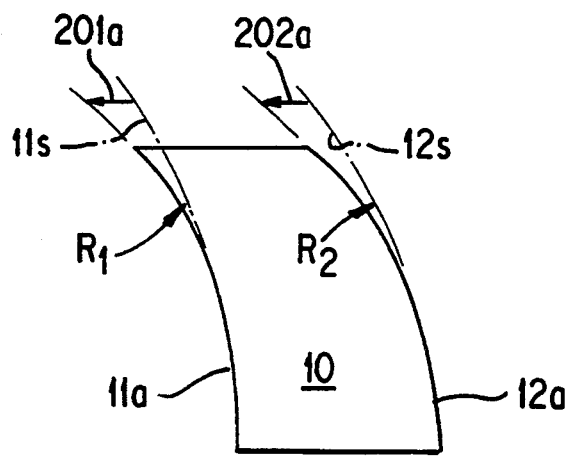
FIG. 10 is an schematic illustration showing aspherical surfaces of a single component bi-aspherical lens of the taking lens system shown in FIG. 9.
Figure 11A:
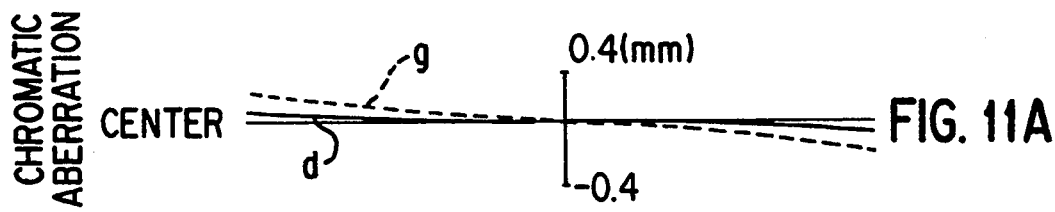
FIG. 11 is a diagram showing lateral chromatic aberrations of the taking lens system shown in FIG. 9.
Figure 11B:
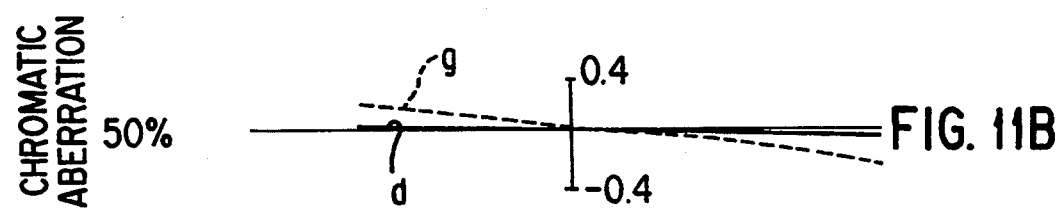
Figure 11C:
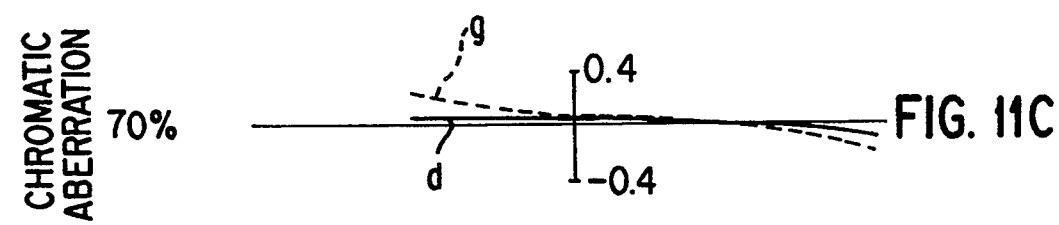
Figure 11D:
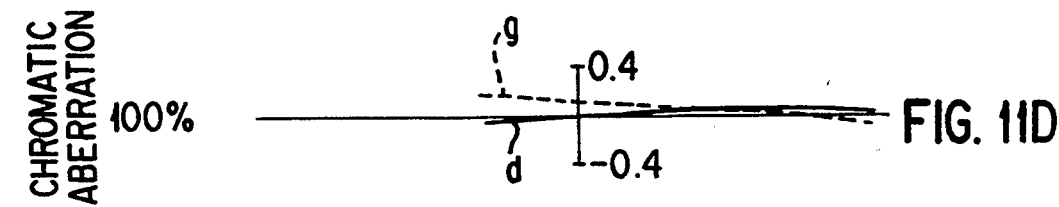

As shown in FIG. 10, the first aspherical surface 11a has a surface sag 201a, from the first reference spherical surface $11_s$, which increases with a semi-aperture distance from the optical axis Aa of the single component bi-aspherical lens 10a so as to cause a gradual increase in negative power. Similarly, the second aspherical surface 12a has a surface sage 202a, from the second reference spherical surface $12_s$, which increases with a semi-aperture distance from the optical axis Aa of the bi-aspherical single component lens 10a so as to cause a gradual increase in positive power.

A specific example of the single component bi-aspherical lens 10a is scaled as follows:

| | |
|---|---|
| The diameter of the bi-aspherical lens 10a | 5.86 mm. |
| The radius of curvature R1 of the first reference spherical surface $11_s$ | −11,4715 mm. |
| The radius of curvature R2 of the second reference spherical surface $12_s$ | −7.8.7018 mm. |
| The ratio of radius of reference curvatures R1/R2 | 1.348 |
| The focal distance of the bi-aspherical lens 10a | 58.288 mm. |
| F-number (F No.) | 15.0 |
| The distance D1 of the aperture stop 14 from the bi-aspherical lens 10 | 4.5 mm. |
| The axial distance D1 between the first and second aspherical surfaces 11 and 12 | 2.2 mm. |
| The distance D3 of the image surface 15 from the bi-aspherical lens 10 | 61.06 mm. |
| The refractive index $n_d$ of the lens glass for d-spectrum (yellow helium: wavelength = 587.56 nm.) | 1.490231 |
| The dispersion $\nu_d$ of the lens glass for d-spectrum (yellow helium: wavelength = 587.56 nm.) | 57.5 |

TABLE II

| | Aspherical Surfaces | |
|---|---|---|
| | Surface 11 | Surface 12 |
| C | −0.0871726 | −0.1149188 |
| K | −4.5855173 | −4.3356303 |
| D2 | $-1.2570972 \times 10^{-3}$ | $-1.5457518 \times 10^{-3}$ |
| D3 | $1.0223081 \times 10^{-5}$ | $2.5768237 \times 10^{-5}$ |
| D4 | $-2.8946884 \times 10^{-7}$ | $-1.3973854 \times 10^{-7}$ |
| D5 | $8.7560186 \times 10^{-10}$ | $-8.6070731 \times 10^{-10}$ |

The single component bi-aspherical lens 10a specified as above refracts strongly parallel marginal rays ML laterally outward with the first aspherical surface 11a as shown in FIG. 9, so as to have a long back focal distance L or the distance D3. Consequently, the utilization of the single component bi-aspherical lens 10a provides an increased available space to camera components in a Z-type easy-to-use camera, so as to dispose these camera components without interference with the optical path.

FIG. 11 shows graphs illustrating lateral chromatic aberration curves of the specific example of the taking lens system TLSa described above. Measurements were made in the same manner for the evaluation of the taking lens system TLS. From reviewing FIG. 11, it is clearly understood that chromatic aberrations are indistinguishable between d-spectrum and g-spectrum and reduced effectively.

Figure 12A:
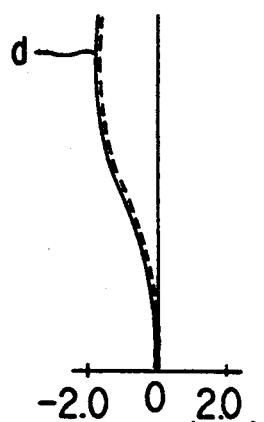
FIG. 12 is a diagram showing various aberrations, other than lateral chromatic aberrations, measured on a curved image plane, of the taking lens system shown in FIG. 9.
Figure 12B:
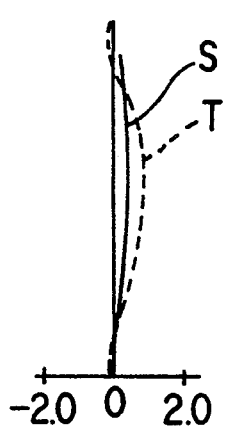
Figure 12C:
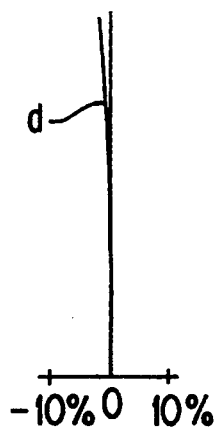

FIG. 12 shows graphs illustrating curves of other aberrations, such as spherical aberration, curvature of field and distortion, of the specific example of the taking lens system TLSa described above. Measurements were conducted in the same manner as for the evaluation of the taking lens system TLS. From the review of FIG. 12, it is clearly understood that the spherical aberration for d-spectrum is indistinguishable from or complies with the sine condition depicted by a chained line; that the curvature of field for sagittal (S) and tangential (T) rays becomes slightly larger in a close proximity to the periphery but, however, is within permissible limits and astigmatism is small. The distortion is also noticeably small.

Figure 13A:
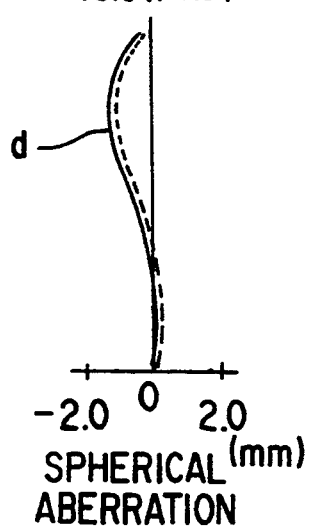
FIG. 13 is a diagram showing various aberrations measured, on a flat image plane, of an another example of the single component taking lens system.
Figure 13B:
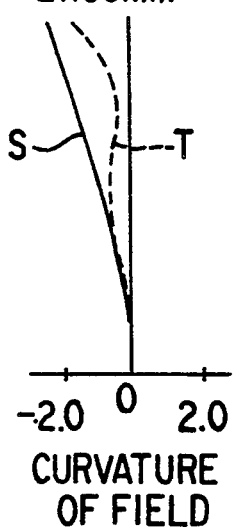
Figure 13C:
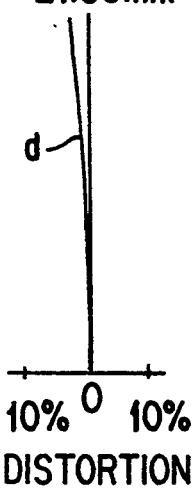

Referring to FIG. 13, aberrations of another example of the taking lens system TLSa, which is identical in mechanical and optical dimensions with the taking lens system TLS with an exception of a focal distance of 67.65 mm, are shown. Measurements were conducted in the same conditions as for the other example of the taking lens system TLS. From a review of FIG. 13, it is also understood that the lens 10 exhibits the spherical aberration for d-spectrum which is indistinguishable from or complies with the sine condition depicted by a chained line, the curvature of field for sagittal (S) and tangential (T) rays which are slightly larger in a close proximity to the periphery but within permissible limits and produce only small astigmatism, and noticeably small distortion.

As described in detail above, the taking lens system of the present invention, having a positive meniscus type of single component bi-aspherical lens, which is designed and adapted to have the ratio of a radius of curvature of a reference concave spherical surface of a concave aspherical surface to a radius of curvature of a reference convex spherical surface of a convex aspherical surface between 1.0 and 2.5 and to have a surface sag of the convex aspherical surface, from the reference convex spherical surface, increasing with a semi-aperture distance from an optical axis of the single component bi-aspherical lens so as to cause a gradual increase in positive power and a surface sag of the concave aspherical surface, from the reference concave spherical surface, increasing with a semi-aperture distance from the optical axis so as to cause a gradual increase in negative power, and an aperture stop disposed facing to the convex aspherical surface of the single component bi-aspherical meniscus lens, is considerably improved, in particular, chromatic aberrations of magnification and high orders of coma as well as other aberrations, such as spherical aberrations, curvature of field distortion. Accordingly, the taking lens system of the present invention is favorably applied to easy-to-use cameras, industrial TV cameras and closed circuit TV cameras with the result of high resolution pictures or images.

It is to be understood that although the present invention has been described in detail with respect to preferred embodiments, various other embodiments and variants may occur to those skilled in the art by following the teachings herein. Such other embodiments and variants fall within the scope and spirit of the invention and are intended to be covered by the following claims.

What is claimed is:

1. A taking lens system for a camera comprising:
   a single component bi-aspherical lens of a positive meniscus type having a ratio of a radius of curvature of a reference concave spherical surface of a concave aspherical surface to a radius of curvature of a reference convex spherical surface of a convex aspherical surface between 1.0 and 2.5; and
   an aperture stop facing a convex aspherical surface of said single component bi-aspherical meniscus lens;
   wherein said convex aspherical surface has a surface sag, from said reference convex spherical surface, which increases with a semi-aperture distance from an optical axis of the single component bi-aspherical lens so as to cause a gradual increase in positive power, and said concave aspherical surface has a surface sag, from said reference concave spherical surface, which increases with a semi-aperture distance from said optical axis so as to cause a gradual increase in negative power.

2. A taking lens system as defined in claim 1, wherein said single component bi-aspherical lens is placed with said convex aspherical surface directed toward an object end.

3. A taking lens system as defined in claim 2, wherein said single component bi-aspherical lens is scaled to an axial distance of 2.3 mm, a focal length of 62.67 mm, an F-number of 15.0, a refractive index $n_d$ of 1.490231 and a dispersion $\nu_d$ of 57.5, and said aspherical surfaces are defined by the following relationship:

$$X = \frac{Cy^2}{1 + \sqrt{1 - KC^2y^2}} + \sum_{i=2}^{5} Di \times y^{2i}$$

and described substantially as follows:

|  | Convex Surface | Concave Surface |
| --- | --- | --- |
| Radius (mm) | 6.9039 | 7.9290 |
| C | 0.14485 | 0.12612 |
| K | −1.0574141 | 6.8722149 |
| D2 | 9.870394 × 10$^{-4}$ | −7.5554230 × 10$^{-4}$ |
| D3 | 2.1136114 × 10$^{-5}$ | −1.2685853 × 10$^{-4}$ |
| D4 | −3.9899681 × 10$^{-7}$ | 1.3506674 × 10$^{-7}$ |
| D5 | −3.2388885 × 10$^{-10}$ | 9.0864517 × 10$^{-11}$ | where X is the surface sag at a semi-aperture distance y from the optical axis of the single component bi-aspherical lens, C is a curvature of a reference spherical lens surface at said optical axis, K is a conic constant, and Di is an aspherical coefficient.

4. A taking lens system as defined in claim 3, wherein said aperture stop is stationary relative to and disposed at a distance of 1.3 mm from said single component bi-aspherical lens.

5. A taking lens system as defined in claim 1, wherein said single component bi-aspherical lens is placed with said concave aspherical surface directed toward the image end.

6. A taking lens system as defined in claim 5, wherein said single component bi-aspherical lens is scaled to an axial distance of 2.2 mm, a focal length of 58.288 mm, an F-number of 15.0, a refractive index $n_d$ of 1.490231 and a dispersion $_d$ of 57.5, and said aspherical surfaces are defined by the following relationship:

$$X = \frac{Cy^2}{1 + \sqrt{1 - KC^2y^2}} + \sum_{i=2}^{5} Di \times y^{2i}$$

and described substantially as follows:

|  | Convex Surface | Concave Surface |
| --- | --- | --- |
| Radius (mm) | −8.7018 | −11.4715 |
| C | 0.1149188 | −0.0871726 |
| K | −4.3356303 | −4.5855173 |
| D2 | −1.5457517 × 10$^{-3}$ | −1.2570972 × 10$^{-3}$ |
| D3 | 2.5768237 × 10$^{-5}$ | 1.0223081 × 10$^{-5}$ |
| D4 | −1.3973854 × 10$^{-7}$ | −2.8946884 × 10$^{-7}$ |
| D5 | −8.6070731 × 10$^{-10}$ | 8.7560186 × 10$^{-10}$ | where X is the surface sag at a semi-aperture distance y from the optical axis of the single component bi-aspherical lens, C is a curvature of a reference spherical lens surface at said optical axis, K is a conic constant, and Di is an aspherical coefficient.

7. A taking lens system as defined in claim 6, wherein said aperture stop is disposed stationary relative to and at a distance of 4.5 mm from said single component bi-aspherical lens.

* * * * *